US012771262B2

(12) United States Patent
Tian et al.

(10) Patent No.: US 12,771,262 B2
(45) Date of Patent: Oct. 20, 2026

(54) PORTABLE AC-DC POWER CONVERTER AND ON-BOARD POWER SUPPLY MANAGEMENT DEVICE

(71) Applicant: Carrier Corporation, Palm Beach Gardens, FL (US)

(72) Inventors: Jian Tian, Shanghai (CN); Hai Tian, Shanghai (CN); Linhui Chen, Shanghai (CN); Fei Xie, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/761,659

(22) Filed: Jul. 2, 2024

(65) Prior Publication Data

US 2025/0023484 A1 Jan. 16, 2025

(30) Foreign Application Priority Data

Jul. 10, 2023 (CN) ......................... 202310845058.5

(51) Int. Cl.
*H02M 7/00* (2006.01)
*B60R 16/033* (2006.01)

(52) U.S. Cl.
CPC ........... *H02M 7/003* (2013.01); *B60R 16/033* (2013.01)

(58) Field of Classification Search
CPC ............................ H02M 7/003; B60R 16/033
See application file for complete search history.

(56) References Cited

U.S. PATENT DOCUMENTS

2016/0137099 A1* 5/2016 Takeshita .............. B60L 3/0053 307/10.1
2018/0123370 A1* 5/2018 Schartner ............. B23K 9/1006
(Continued)

FOREIGN PATENT DOCUMENTS

CN 102431413 A 5/2012
CN 106068595 A 11/2016
(Continued)

OTHER PUBLICATIONS

Anonymous: "CHAdeMO—Wikipedia", Wikipedia, Oct. 18, 2021 (Oct. 18, 2021), pp. 1-15, XP055954936, Retrieved from the Internet: URL:https://web.archive.org/web/2021101814 1940/https://en.wikipedia.org/wiki/CHAdeMO retrieved on Aug. 25, 2022.
(Continued)

*Primary Examiner* — Ryan Johnson
*Assistant Examiner* — Esayas G Yeshaw
(74) *Attorney, Agent, or Firm* — Souad Hakim

(57) ABSTRACT

The present application relates to a portable AC-DC power converter for an on-board refrigeration unit and an on-board power supply management device suitable for use in conjunction with the aforementioned portable AC-DC power converter. A portable AC-DC power converter for on-board electrical equipment according to one aspect of the present application comprises: an AC-DC conversion unit; one or more AC power plugs connected to an input terminal of the AC-DC conversion unit; and one or more connectors connected to an output terminal of the AC-DC conversion unit, wherein the connector comprises a DC output interface and a conductor, where the conductor is configured to short circuit contacts arranged on the refrigeration unit on the vehicle side when the DC output interface is engaged with a DC input interface of an on-board connector to generate a
(Continued)

30

30 trigger signal to disconnect the on-board electrical equipment from an on-board power source.

20 Claims, 5 Drawing Sheets

(56) References Cited

U.S. PATENT DOCUMENTS

| | | | | |
|---|---|---|---|---|
| 2018/0340729 A1* | 11/2018 | Sugar | G08B 21/182 |
| 2021/0066013 A1* | 3/2021 | Kumar | H01H 71/123 |
| 2022/0209564 A1 | 6/2022 | Hashimoto et al. | |
| 2022/0320884 A1* | 10/2022 | Hu | H02M 3/01 |
| 2022/0371462 A1* | 11/2022 | Isaksson | B60L 53/11 |

FOREIGN PATENT DOCUMENTS

| | | | |
|---|---|---|---|
| CN | 108202575 | A | 6/2018 |
| CN | 108291760 | A | 7/2018 |
| CN | 109539660 | A | 3/2019 |
| CN | 112793392 | A | 5/2021 |
| JP | H01285756 | A | 11/1989 |
| JP | 2003097870 | A | 4/2003 |
| JP | 2003176968 | A | 6/2003 |
| JP | 2012044342 | A | 3/2012 |
| JP | 2018197647 | A | 12/2018 |
| JP | 2020043636 | A | 3/2020 |
| KR | 10-2012-0001304 | A | 1/2012 |
| TW | 201741165 | A | 12/2017 |
| WO | 2017017197 | A1 | 2/2017 |
| WO | 2018220496 | A1 | 12/2018 |

OTHER PUBLICATIONS

Extended European Search Report received for EP Application No. 24187488.2, mailed on Dec. 17, 2024, 9 Pages.

* cited by examiner

PORTABLE AC-DC POWER CONVERTER AND ON-BOARD POWER SUPPLY MANAGEMENT DEVICE

CROSS REFERENCE TO A RELATED APPLICATION

The application claims the benefit of China Patent Application No. 202310845058.5 filed Jul. 10, 2023, the contents of which are hereby incorporated in their entirety.

TECHNICAL FIELD

The present application relates to power management technologies and cold chain transportation technologies, in particular to a portable AC-DC power converter for an on-board refrigeration unit and an on-board power supply management device suitable for use in conjunction with the aforementioned portable AC-DC power converter.

BACKGROUND

In the cold chain transportation industry, the use of batteries as a cooling energy source is becoming a development trend to reduce carbon dioxide emissions. FIG. 1 is a schematic diagram of an electrical vehicle equipped with an on-board refrigeration unit. Referring to FIG. 1, an electrical vehicle 10 comprises a high-voltage DC battery 110 for providing driving power, a low-voltage DC battery 120, and an on-board refrigeration unit 130. Considering the high power consumption of the on-board refrigeration unit 130, it is a wise choice to use the high-voltage DC battery 110 as its energy source. However, the capacity improvement of the high-voltage DC battery 110 faces many constraints, such as the energy density of battery materials, the safety of battery use, and other constraints. Therefore, in the case that meeting the demand for driving distance has already faced huge challenges, it is necessary to minimize the power supply from the battery to the on-board refrigeration unit as much as possible. In particular, incidents such as battery depletion or shortened cruising distance of electrical vehicles caused by supplying power to the on-board refrigeration unit need to be avoided.

SUMMARY

According to one aspect of the present application, a portable AC-DC power converter for on-board electrical equipment is provided, comprising:

- an AC-DC conversion unit;
- one or more AC power plugs connected to an input terminal of the AC-DC conversion unit; and
- one or more connectors connected to an output terminal of the AC-DC conversion unit, wherein the connector comprises a DC output interface and a conductor, the conductor is configured to short circuit contacts arranged on the vehicle side to generate a trigger signal to disconnect the on-board electrical equipment from the on-board power source when the DC output interface is engaged with a DC input interface of an on-board connector.

Optionally, in the above-mentioned portable AC-DC power converter, the DC output interface comprises:

- a base; and
- male terminals or female terminals arranged on the base.

Further, optionally, in the above-mentioned portable AC-DC power converter, the conductor is a metal connecting wire arranged on the base and located between the male terminals or the female terminals.

As an alternative, optionally, in the above-mentioned portable AC-DC power converter, the conductor is a metal connecting wire arranged on the base and located on one side of the male terminals or one side of the female terminals.

Still further, optionally, in the above-mentioned portable AC-DC power converter, the metal connecting wire is c-shaped, with its end further away from the surface of the base compared to the ends of the male terminals.

Optionally, in the above-mentioned portable AC-DC power converter, there are a plurality of AC power plugs.

Optionally, in the above-mentioned portable AC-DC power converter, there are a plurality of connectors.

According to another aspect of the present application, an on-board power supply management device suitable for use in conjunction with the aforementioned portable AC-DC power converter is provided, comprising:

- an on-board control unit configured to control the connection status between the on-board electrical equipment and the on-board power source;
- an on-board connector, comprising a DC input interface and contacts, wherein the contacts are connected to the on-board control unit,
- wherein when the DC output interface of the portable AC-DC power converter is engaged with the DC input interface of the on-board connector, the contacts are short circuited through the conductor to generate a trigger signal at the on-board control unit, the on-board control unit disconnects the on-board electrical equipment from the on-board power source in response to the trigger signal.

Optionally, in the above-mentioned on-board power supply management device, the on-board control unit is in the form of a printed circuit board.

Optionally, in the above-mentioned on-board power supply management device, a switch located between the on-board electrical equipment and the on-board power source is further included, wherein the on-board control unit controls the connection status between the on-board electrical equipment and the on-board power source by controlling the on/off state of the switch.

Optionally, in the above-mentioned on-board power supply management device, the DC input interface comprises:

- a base; and
- female terminals or male terminals arranged on the base.

Optionally, in the above-mentioned on-board power supply management device, the on-board electrical equipment is an on-board refrigeration unit.

BRIEF DESCRIPTION OF THE DRAWINGS

The above and/or other aspects and advantages of the present application will become clearer and easier to understand through the description of various aspects in conjunction with the accompanying drawings, where the same or similar units are denoted by the same reference signs. The accompanying drawings comprise.

DETAILED DESCRIPTION

The present application is described in a more comprehensive manner below with reference to the accompanying drawings that illustrate the exemplary embodiments of the present application. However, the present application can be implemented in different forms and should not be interpreted as limited to the various embodiments provided herein. The various embodiments provided above are intended to make the disclosure of the present application comprehensive and complete, so as to convey the scope of protection of the present application to those skilled in the art in a more comprehensive manner.

In this description, terms such as "include" and "comprise" indicate that, in addition to having units and steps that are directly and explicitly stated in the description and claims, the technical solution of the present application does not exclude the possibility of having other units and steps that are not directly or explicitly stated.

In this description, terms such as "A connected to B" and "A connected with B" indicate the following situations: i) there is a direct electrical or mechanical connection between A and B; ii) an electrical or mechanical connection is established between A and B through C.

Unless otherwise specified, terms such as "first" and "second" do not indicate the order of the units in terms of time, space, size, etc., but are only used to distinguish the units from each other.

Figure 1:
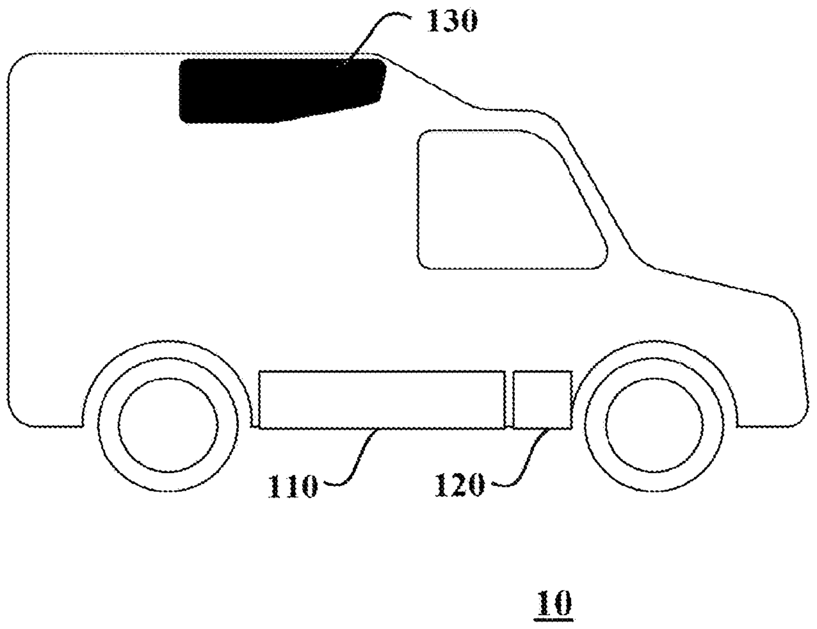
FIG. 1 is a schematic diagram of an electrical vehicle equipped with on-board electrical equipment.
Figure 2:
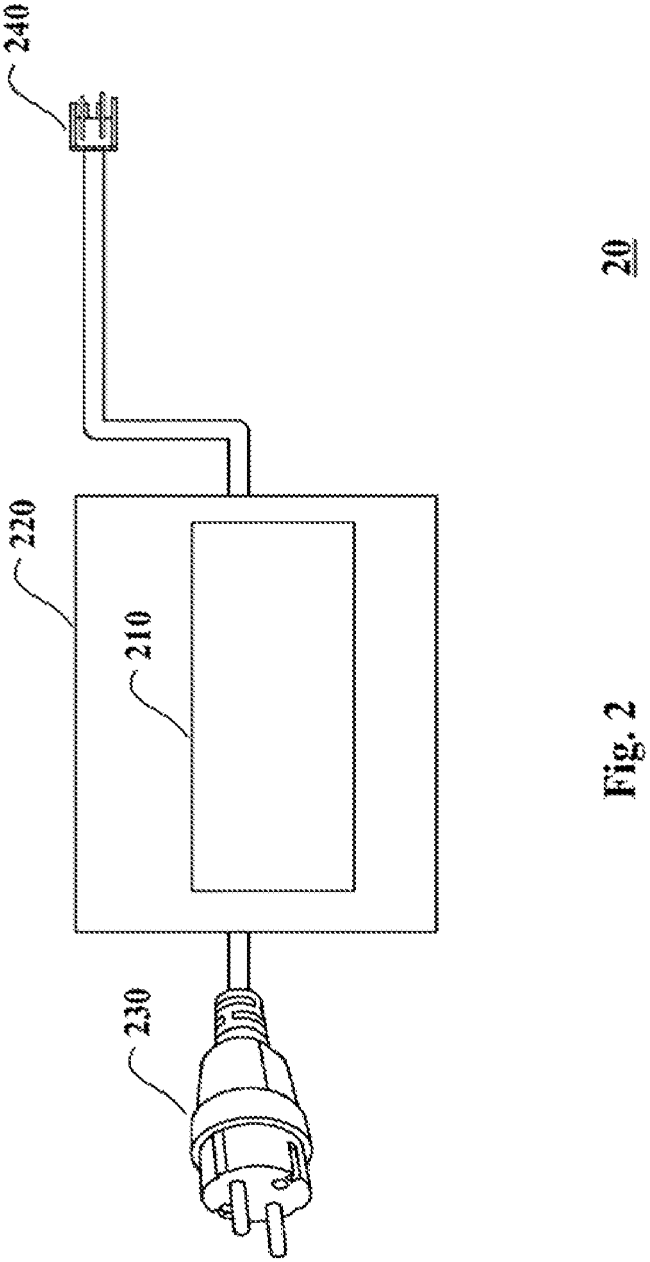
FIG. 2 is a schematic diagram of a portable AC-DC power converter according to some embodiments of the present application.

FIG. 2 is a schematic diagram of a portable AC-DC power converter according to some embodiments of the present application. It should be noted that in addition to the units shown in FIG. 2, the AC-DC power converter also comprises other indispensable units for the realization of energy conversion. However, for the sake of brevity, FIG. 2 and the following depiction will only relate to units directly related to the technical problem addressed in the present application.

The portable AC-DC power converter 20 shown in FIG. 2 comprises an AC-DC conversion unit 210, a housing 220 that accommodates the AC-DC conversion unit 210, an AC power plug 230, and a connector 240. The function of the AC-DC conversion unit 210 can be achieved using various existing AC-DC conversion circuits, and in some embodiments, the unit 210 is implemented in the form of a printed circuit board. The AC power plug 230 serves as the interface for electrical energy input and can be connected to the input terminal of the AC-DC conversion unit 210 through a cable. On the other hand, the connector 240 serves as an interface for electrical energy output, which can be connected to the output terminal of the AC-DC conversion unit 210 through a cable and can be engaged with the on-board connector to enable the on-board device, such as an on-board refrigeration unit, to draw electrical energy from the portable AC-DC power converter 20.

Compared to the method of mounting an AC-DC power converter in a vehicle or a fixed location (such as a building), the portable AC-DC power converter 20 is physically separable from the power supply and the on-board electrical equipment (such as an on-board refrigeration unit), which greatly facilitates the operation of supplying power from an external power source to the on-board electrical equipment. In addition, as the AC-DC power converter is no longer integrated with the on-board electrical equipment, the AC-DC power converter and the electrical equipment can be designed independently of each other, thus providing high flexibility in design, especially for the on-board refrigeration unit. In addition, the spatial separation mentioned above also allows an AC-DC power converter to be shared by electrical equipment of different vehicles, thereby reducing equipment costs. Furthermore, supplying power to on-board electrical equipment from an AC power source when the vehicle is parked in a fixed location can reduce the usage time of the on-board power source (such as on-board batteries, on-board diesel generator sets), thereby extending the service life of on-board batteries and reducing carbon emissions. Still further, as it only involves the management of power supply from external power sources to on-board electrical equipment and does not involve the charging of on-board batteries by external power sources, the control logic of the portable AC-DC power converter 20 is simplified (such as the monitoring of the charging voltage and current, and the provision of battery protection mechanisms).

It should be noted that although one AC power plug and one connector are provided in the portable AC-DC power converter shown in FIG. 2, this is only an example. In other embodiments, the number of AC power plugs may be more than one, and this is also the case for connectors. By configuring a plurality of AC power plugs and connectors for a portable AC-DC power converter, it is possible to simultaneously power the electrical equipment of a plurality of vehicles or a plurality of pieces of electrical equipment of the same vehicle, thereby saving the number of portable AC-DC power converters.

In some applications, when the electrical equipment is connected to a portable AC-DC power converter, it is necessary to disconnect the former from the on-board power source (such as the on-board battery). For example, for an on-board refrigeration unit, it is powered by the vehicle's high-voltage DC battery during driving. Due to the difference in output power between the high-voltage DC battery and the AC-DC power converter, sudden switching between power sources may have an impact on the refrigeration unit and battery, thereby affecting their service life and even causing damage to the equipment and battery.

In some embodiments, a protection mechanism is provided to prevent the occurrence of the above situation. Specifically, the connector 240 includes not only a DC output interface, but also a conductor. The configuration of the conductor causes the contacts arranged on the vehicle side to be short circuited when the DC output interface is engaged with the DC input interface of the on-board connector, resulting in the generation of a trigger signal that will lead to the disconnection between the on-board electrical equipment and the on-board battery. The above protection mechanism has the advantages of simple and reliable implementation, no need for manual intervention (such as manually switching the power source), and avoiding complex control logic.

Figure 3A:
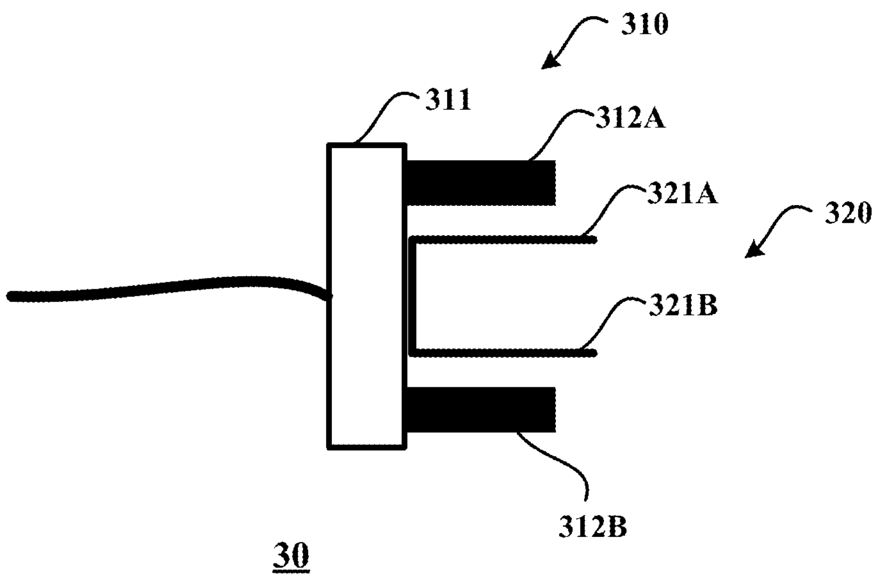
FIGS. 3A and 3B are schematic diagrams of a connector for a portable AC-DC power converter according to other embodiments of the present application.

It should be noted that the conductor referred to here should be interpreted in a broad sense as a conducting medium that can short circuit the contacts on the vehicle side together. The conductor can be of various shapes and materials, and its position can also be flexibly arranged according to specific applications. In some examples, the conductor may be a metal connecting wire (such as a hard metal wire) in the shape of "⊂" as shown in FIG. 3A. The conductor can also be made of other materials, such as conductive plastics, and it is not limited to specific shapes. For example, it can be in various shapes such as "⎵" shaped, "E"-shaped, "F"-shaped, "H"-shaped, "T"-shaped, and "W"-shaped, as long as the contacts can be short circuited when the DC output interface is connected to the DC input interface. In other examples, the conductor can be in the form of a keycap, which is a component commonly used to implement jumpers on computer motherboards, and correspondingly, contacts can be in the form of pins.

Figure 3B:
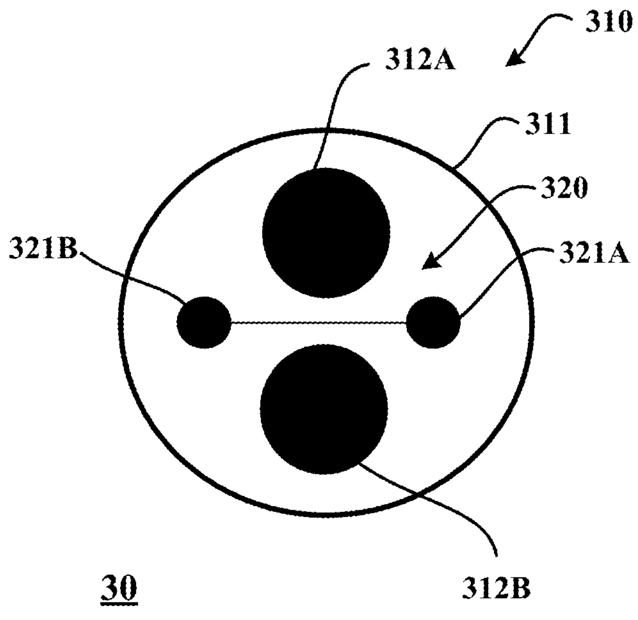

FIGS. 3A and 3B are schematic diagrams of a connector for a portable AC-DC power converter according to other embodiments of the present application, where FIG. 3A is a side view of the connector and FIG. 3B is a front view of the connector. The embodiment shown in FIGS. 3A and 3B provides an exemplary embodiment of the above-mentioned protection mechanism and can be used for the connector 240 in FIG. 2.

As shown in FIGS. 3A and 3B, the connector 30 comprises a DC output interface 310 and a conductor 320. For example, the DC output interface 310 comprises a base 311 and male terminals 312A and 312B arranged on the base 310, which are to be engaged with the female terminals (not shown) on the on-board connector, so as to establish an electrical connection between the AC-DC conversion unit and the on-board electrical equipment. The male terminals referred to here are also known as male connectors, connectors, pins, and plugs, etc., which typically have protrusions or ends in the shape of rods or copper plates. The female terminals referred to here are also known as female connectors, which typically have slots or recesses suitable for physically inserting male connectors. It should be noted that in other embodiments, the male terminal 312 arranged on the base can also be replaced with a female terminal.

Referring to FIG. 3A, in the embodiment illustrated, the conductor 320 is a metal connecting wire (such as a hard metal wire) in the shape of "⊂", with the ends 321A and 321B facing outward. When the male terminals 312A and 312B move towards the female terminals of the on-board connector (such as moving to the right in the figure), the ends 321A and 321B will be pressed against the contacts T1 and T2 arranged on the vehicle side, thereby short circuiting the contacts T1 and T2 together. As further described below, this short circuiting will generate a trigger signal in the on-board control unit to disconnect the on-board electrical equipment from the on-board battery.

Referring to FIG. 3B, in the embodiment illustrated, the metal connecting wire serving as the conductor 320 is arranged on the base 311 and located between the male terminals 312A and 312B. However, this is only an exemplary manner, while in some other embodiments, the conductor arranged on the base may also be located on one side of the male terminals or on one side of the female terminals.

With continued reference to FIG. 3A and in conjunction with FIG. 3B, optionally, the ends 321A and 321B are further away from the surface 311A of the base 311 compared to the ends of the male terminals 312 A and 312B. Therefore, it can be ensured that the metal connecting wire has short circuited the contacts on the vehicle side when or before the male terminals are engaged with the female terminals of the on-board connector.

Figure 4:
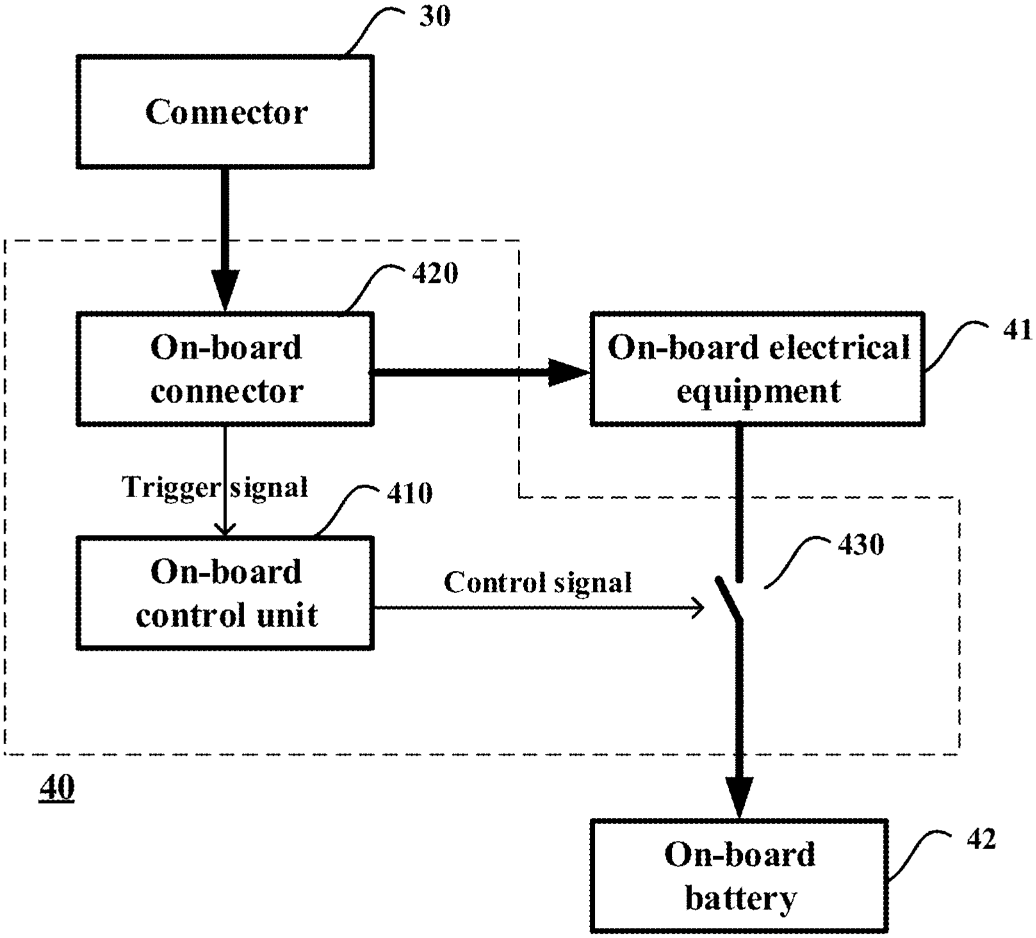
FIG. 4 is a schematic diagram of an on-board power supply management device according to other embodiments of the present application.

FIG. 4 is a schematic diagram of an on-board power supply management device according to other embodiments of the present application. The on-board power supply management device shown in FIG. 4 can be used in conjunction with the portable AC-DC converter shown in FIG. 2 to complete the power supply from an external power source to the on-board electrical equipment.

As shown in FIG. 4, the on-board power supply management device 40 comprises an on-board control unit 410, an on-board connector 420, and a switch 430 located between the on-board electrical equipment and the on-board power source (such as the on-board battery). It should be noted that in addition to the units shown in FIG. 4, the on-board power supply management device also comprises other indispensable units to achieve power supply management. However, for the sake of brevity, FIG. 4 and the following depiction will only relate to units directly related to the technical problem addressed in the present application.

In the on-board power supply management device 40 shown in FIG. 4, the on-board control unit 410 is configured to control the connection status between the on-board electrical equipment 41 (such as the on-board refrigeration unit) and the on-board battery 42 (such as the DC high-voltage battery). Optionally, the on-board control unit 410 can be implemented in the form of a printed circuit board. Alternatively, the on-board power supply management device 40 also comprises a switch 430 located between the on-board electrical equipment 41 and the on-board battery 42. The on-board control unit 410 controls the connection status between the on-board electrical equipment 41 and the on-board battery 42 by controlling the on/off state of the switch 430.

Figure 5:
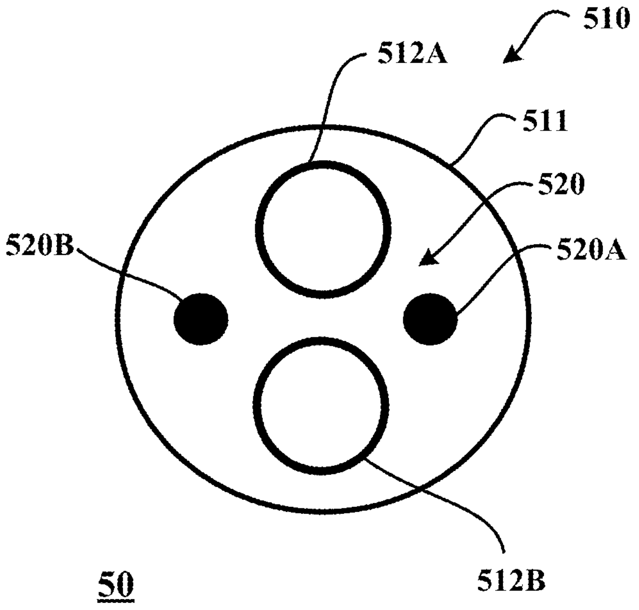
FIG. 5 is a schematic diagram of an on-board connector of an on-board power supply management device according to other embodiments of the present application.

FIG. 5 is a schematic diagram of an on-board connector of an on-board power supply management device according to other embodiments of the present application. The on-board connector shown can be used to implement the on-board connector 420 in FIG. 4 and is adapted to the connector shown in FIGS. 3A and 3B.

In the embodiment shown in FIG. 5, the on-board connector 50 comprises a DC input interface 510 and contacts 520A and 520B. For example, the DC input interface 510 comprises a base 511 and female terminals 512A and 512B arranged on the base 510 and adapted to the male terminals of the connector 30 shown in FIGS. 3A and 3B. It should be noted that when the terminals of the connector 30 are female terminals, the female terminals arranged on the base 511 will be replaced with male terminals accordingly so as to be adapted to the connector 30.

It should be noted that the contacts referred to here should be interpreted in a broad sense as components that can switch between electrical isolation and electrical connection. They can be of various shapes and materials, and their positions can also be flexibly arranged according to specific applications. In some examples, the contacts may be point-shaped metal solder pads as shown in FIG. 5, but other materials (such as conductive plastics) and other shapes (such as pins, plates, spheres, polyhedral, and other shapes) can also be used, as long as the contacts can be short circuited together through a conductor when the DC output interface is engaged with the DC input interface. In addition, the positions of the contacts can be arranged based on the position of the conductor in the connector 30.

With continued reference to FIG. 5, in the embodiment illustrated, the contacts 520A and 520B can be connected to the on-board control unit 410 through wires, for example, to electronic components arranged on a printed circuit board for implementing the functions of the on-board control unit. When the connector 30 is not engaged with the on-board connector 50, the contacts 520A and 520B are in an electrically isolated state. On the other hand, when the male terminals of the connector 30 moves towards the female terminals 512A and 512B of the on-board connector, the ends 321A and 321B of the conductor of the connector 30 will be pressed against the contacts 520A and 520B, causing the latter to be short circuited together. The short circuiting of the contacts 520A and 520B will generate a trigger signal in the on-board control unit 410. In response to the trigger signal, the on-board control unit 410 disconnects the on-board electrical equipment 41 from the on-board battery 42, for example, by placing the switch 430 in a disconnected state.

Figure 6:
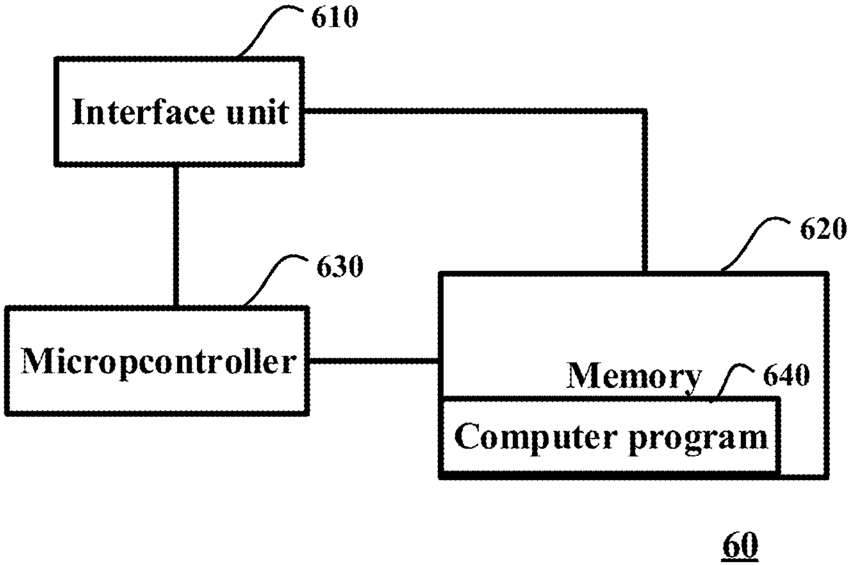
FIG. 6 is a schematic block diagram of a typical processing device.

FIG. 6 is a schematic diagram of a typical processing device. The processing device shown in FIG. 6 can be used to implement the on-board control unit in FIG. 4.

As shown in FIG. 6, the processing device 60 comprises an interface unit 610, a memory 620 (such as a non-volatile memory such as flash memory, ROM, hard drive, disk, optical disc, etc.), a microcontroller 630, and computer programs 640.

The interface unit 610 is configured to convert the control signal generated by the microprocessor 630 into a corresponding driving signal and provide it to the controlled unit (such as the switch 430 in FIG. 4).

The memory 620 stores computer programs 640 that can be executed by the microcontroller 630. In addition, the memory 620 can also store data generated by the microcontroller 630 when executing computer programs.

The microcontroller 630 is configured to run the computer programs 640 stored on the memory 620 and access data on the memory 620. Optionally, the port of the microcontroller 630 can be connected to the contacts 520A and 520B in FIG. 5. When the contacts 520A and 520B are short circuited, a trigger signal will be generated on the port, causing the microcontroller 630 to generate a control command to disconnect the on-board electrical equipment 41 from the on-board battery 42.

Those skilled in the art will appreciate that the various schematic logic blocks, modules, circuits, and algorithm steps described herein can be implemented as electronic hardware, computer software, or a combination of both.

In order to demonstrate the interchangeability between hardware and software, various schematic components, blocks, modules, circuits, and steps are described above as a whole based on their functionality. The implementation of such functionality in the form of hardware or software depends on the specific application and the design constraints imposed on the overall system. Those skilled in the art may implement the described functionality according to specific applications and in varying ways, but such implementation decisions should not be understood as causing a deviation from the scope of the present application.

Although only some specific embodiments of the present application have been described, those skilled in the art should be aware that the present application can be implemented in many other forms without deviating from its main idea and scope. Therefore, the examples and embodiments shown are considered illustrative rather than restrictive, and the present application may cover various modifications and substitutions without departing from the spirit and scope of the present application as defined by the appended claims.

The embodiments and examples are provided herein to best illustrate the embodiments according to the technologies and specific applications of the present application, so that those skilled in the art can implement and use the present application. However, those skilled in the art will be aware that the above depictions and examples are provided only for the sake of illustration and exemplification. The depictions provided are not intended to cover all aspects of the present application or to limit the present application to the precise form disclosed.

What is claimed is:

1. A portable AC-DC power converter for on-board electrical equipment, comprising:

an AC-DC conversion unit;

one or more AC power plugs connected to an input terminal of the AC-DC conversion unit; and one or more connectors connected to an output terminal of the AC-DC conversion unit, wherein the one or more connectors comprises a DC output interface and a conductor physically arranged on the DC output interface, wherein when the DC output interface is engaged with a DC input interface of an on-board connector, the conductor mechanically short-circuits a plurality of contacts arranged on a vehicle side to generate a trigger signal to disconnect the on-board electrical equipment from an on-board power source and wherein the trigger signal is generated independent of detection of an electrical fault condition.

2. The portable AC-DC power converter according to claim 1, wherein the DC output interface comprises:

a base; and male terminals or female terminals arranged on the base.

3. The portable AC-DC power converter according to claim 2, wherein the conductor is a metal connecting wire arranged on the base and located between the male terminals or the female terminals.

4. The portable AC-DC power converter according to claim 2, wherein the conductor is a metal connecting wire arranged on the base and located on one side of the male terminals or one side of the female terminals.

5. The portable AC-DC power converter according to claim 3, wherein the metal connecting wire is c-shaped, with its end further away from a surface of the base compared to ends of the male terminals.

6. The portable AC-DC power converter according to claim 1, wherein there are a plurality of AC power plugs.

7. The portable AC-DC power converter according to claim 4, wherein there are a plurality of connectors.

8. An on-board power supply management device suitable for use in conjunction with the portable AC-DC power converter according to claim 1, comprising:

an on-board control unit configured to control a connection status between on-board electrical equipment and an on-board power source;

an on-board connector, comprising a DC input interface and contacts, wherein the contacts are connected to the on-board control unit, wherein when an DC output interface of the portable AC-DC power converter is engaged with the DC input interface of the on-board connector, the contacts are short circuited through the conductor to generate a trigger signal at the on-board control unit, the on-board control unit disconnects the on-board electrical equipment from the on-board power source in response to the trigger signal.

9. The on-board power supply management device according to claim 8, wherein the on-board control unit is in the form of a printed circuit board.

10. The on-board power supply management device according to claim 8, further comprising: a switch located between the on-board electrical equipment and the on-board power source, wherein the on-board control unit controls a connection status between the on-board electrical equipment and the on-board power source by controlling an on/off state of the switch.

11. The on-board power supply management device according to claim 8, wherein the DC input interface comprises:

a base; and female terminals or male terminals arranged on the base.

12. The on-board power supply management device according to claim 8, wherein the on-board electrical equipment is an on-board refrigeration unit.

13. The portable AC-DC power converter of claim 1, wherein the portable AC-DC power converter comprises a plurality of connectors configured to connect to a respective on-board connector arranged on a plurality of vehicles, and wherein in response to the connection of the plurality of connectors with each respective on-board connector, the portable AC-DC power converter is configured to supply power to a respective on-board electrical equipment of the plurality of vehicles.

14. The portable AC-DC power converter of claim 13, wherein the portable AC-DC power converter is configured to simultaneously supply the power to the respective on-board electrical equipment of the plurality of vehicles.

15. The portable AC-DC power converter of claim 1, wherein the one or more connectors press against the contacts arranged on the vehicle to short circuit the contacts.

16. The portable AC-DC power converter of claim 1, wherein a position of the contacts is based on a position of the conductor in the one or more connectors.

17. The on-board power supply management device of claim 8, further comprising a switch located between the on-board electrical equipment and the on-board power source, wherein the on-board control unit is configured to place the switch in a disconnected state in response to the generation of the trigger signal.

18. The on-board power supply management device of claim 8, wherein the on-board control unit is configured to generate a control command, based on the generated trigger signal, to disconnect the on-board electrical equipment from the on-board power source.

19. A system comprising:

a portable AC-DC converter comprising:

an AC-DC conversion unit;

an AC power plug connected to an input terminal of the AC-DC conversion unit; and a connector connected to an output terminal of the AC-DC conversion unit, wherein the connector comprises a DC output interface and a conductor physically arranged on the DC output interface; and an on-board power supply management device comprising:

an on-board connector comprising a plurality of contacts, wherein the DC output interface is connected to the on-board connector, and wherein the connection of the DC output interface with the on-board connector causes the conductor to mechanically short-circuits the plurality of contacts on the on-board connector; and an on-board control unit configured to generate a trigger signal in response to the mechanical short-circuit of the plurality of contacts to operably connect and/or disconnect an on-board electrical equipment and an on-board power source, and wherein the trigger signal is generated independent of detection of an electrical fault condition.

20. The system of claim 19, wherein the on-board control unit is configured to disconnect the on-board electrical equipment and the on-board power source based on the generation of the trigger signal.

* * * * *